Dec. 22, 1959 G. EHRENBERG 2,917,990
APPARATUS FOR COOKING FOODS
Filed Nov. 9, 1954 6 Sheets-Sheet 2

INVENTOR.
GUSTAVE EHRENBERG
BY
ATTORNEYS

INVENTOR.
GUSTAVE EHRENBERG
ATTORNEYS

INVENTOR.
GUSTAVE EHRENBERG

INVENTOR.
GUSTAVE EHRENBERG

Dec. 22, 1959 G. EHRENBERG 2,917,990
APPARATUS FOR COOKING FOODS
Filed Nov. 9, 1954 6 Sheets-Sheet 6
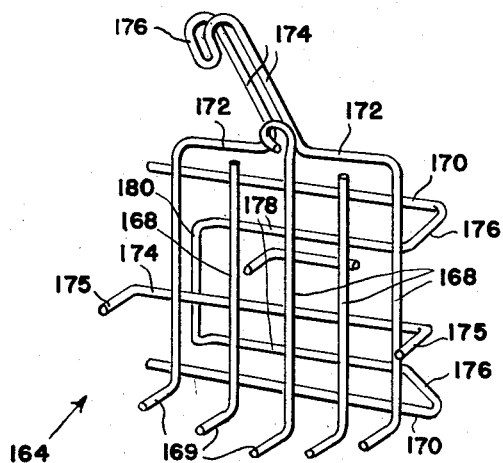
FIG. 6.
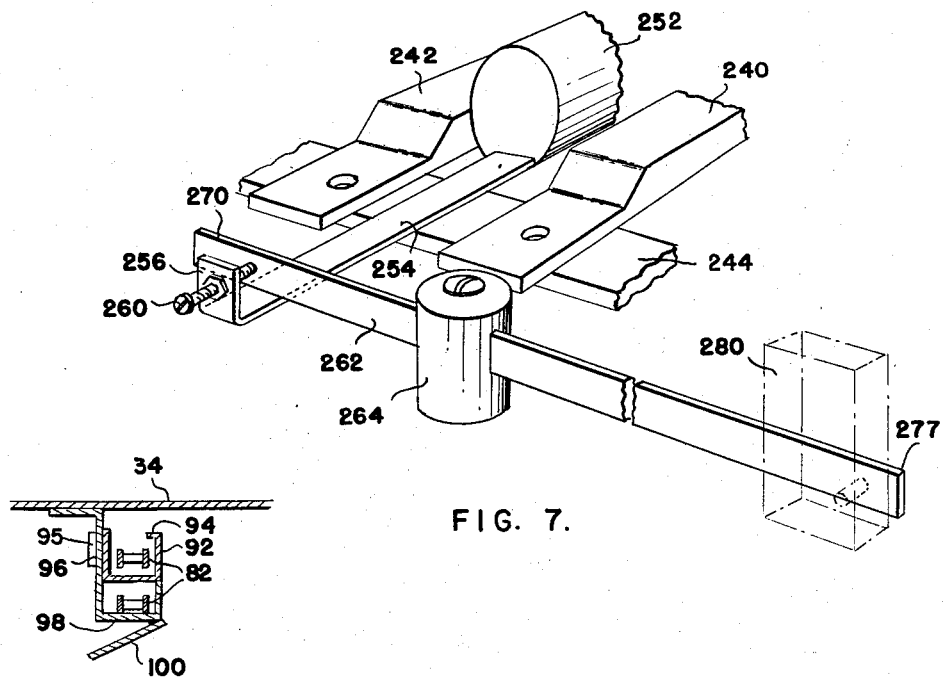
FIG. 7.
FIG. 8.
INVENTOR.
GUSTAVE EHRENBERG
BY
ATTORNEYS United States Patent Office 2,917,990
Patented Dec. 22, 1959

2,917,990
APPARATUS FOR COOKING FOODS
Gustave Ehrenberg, Philadelphia, Pa.
Application November 9, 1954, Serial No. 467,797
8 Claims. (Cl. 99—386)

This invention relates to apparatus for cooking foods and, more particularly, to apparatus for preparing the so-called "hamburger sandwich." In the preparation of a hamburger sandwich, a piece or pat of ground meat is subjected to heat in order to cook the meat and a roll into which the meat is to be placed is toasted or otherwise warmed in order to make the entire sandwich more tasty and attractive.

Heretofore it has been the general practice to fry or otherwise cook the meat on a tray or griddle thus producing a greasy sandwich and impairing the taste and flavor of the meat. The rolls, if toasted, were generally merely placed upon the griddle for a few minutes in order to become warm, in which process quantities of grease were frequently soaked into the roll from the griddle surface.

It is an object of this invention to provide a cooking apparatus in the form of a broiler in which a piece of meat forming one serving may be broiled in a controlled manner in order to cook the meat properly while retaining the meat juices and meat flavor and without imparting foreign flavors to the meat.

It is a further object of this invention to provide a broiler for the production of hamburger sandwiches in which a roll and a piece of meat are simultaneously prepared and delivered, with the meat properly cooked and the roll properly toasted, for assembly into a sandwich.

It is a further object of this invention to provide a neat completely enclosed, automatic cooking apparatus which may be operated by unskilled operators and which is provided with a simple controller for controlling the degree to which meat passing through the apparatus is cooked.

This invention is an improvement over the apparatus shown in my copending patent application Serial No. 210,297, filed February 10, 1951.

A preferred embodiment of the invention is shown in the accompanying drawings in which:

Figure 6 is a perspective view showing one of the hangers which serve to carry a piece of meat through the cooking apparatus;

Figure 7 is a perspective view of a fragmentary portion of the apparatus shown in Figure 2;

Figure 8 is a fragmentary vertical section taken on the trace 8—8 shown in Figure 2.

Figure 1:
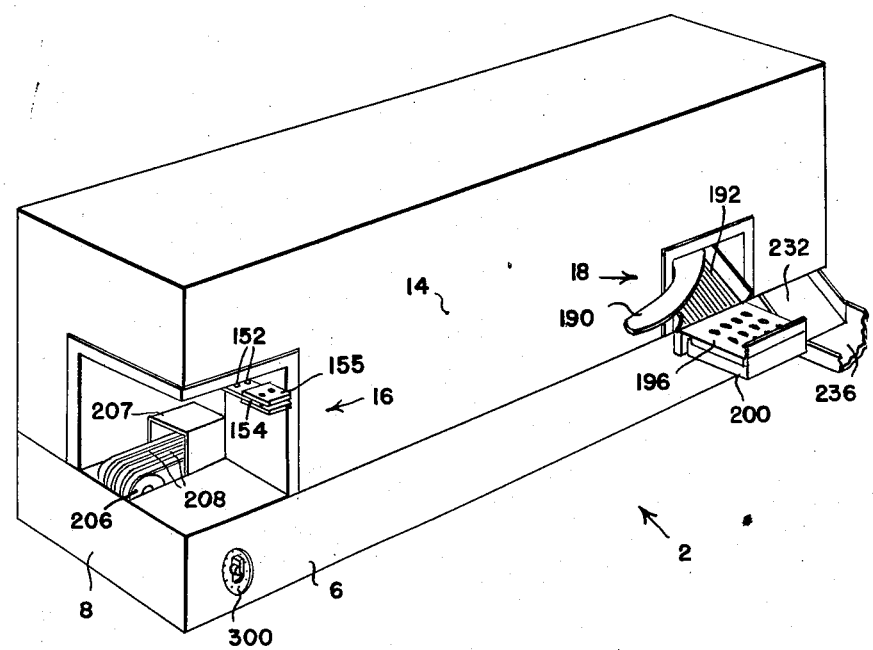
Figure 1 is a perspective view of the assembled and covered apparatus.

In Figure 1 there is shown generally at 2 a perspective view of the assembled cooking apparatus. This apparatus, the details of which are shown in the other drawings, includes a base plate 4 provided with an upstanding front plate 6, an upstanding left or input end plate 8, an upstanding right or discharge end plate 10, and a rear plate 12. A box-shaped cover 14 is positioned over the apparatus and has a cut-away portion at its left-hand end, as indicated at 16 in Figure 1, to provide an opening through which the apparatus may be loaded with meat and rolls and a cut-away portion at its right-hand end, as indicated generally at 18 in Figure 1, through which cooked meat and rolls are discharged.

The upstanding plates 6, 8, 10 and 12 are provided with inwardly turned flanges 20 at their upper edges along which the lower edge of the cover 14 rests. Brackets 22 extending transversely of the apparatus are attached to the base 4 at their ends as indicated at 24 in Figure 5. Angle members 26 are mounted on the brackets 22 adjacent to either end thereof and are adapted to support an insulating liner which is mounted within the cover 14 between it and the apparatus. The liner includes a metal inner shell 28 having outwardly and upwardly extending portions 29 around its lower periphery, as indicated in construction lines in Figure 5, which are adapted to be supported by the angles 26. A covering of insulating material 30 is attached to and supported by the liner 28. An additional layer of insulating material 15 is desirably provided on the inside of the cover 14 as indicated in Figure 5. It will be noted that the Figures 2-5 are shown with the cover and insulating liners removed except for Figure 5 in which these elements are shown fragmentarily. A bottom layer of insulation 25 is supported by a pan 27 resting on the brackets 22.

Positioned within the cover is a framework comprising a pair of spaced vertical members 30 at the left-hand end of the apparatus, a pair of spaced vertical members 31 at the right-hand end of the apparatus, a longitudinally extending member 34 joining the uppermost ends of the members 30 and 31, a pair of lower longitudinally extending members 32 joining the lowermost ends of the members 30 and 31, and transversely extending members 36 and 40 at the left and right-hand ends of the framework, respectively, joining the lower ends of the vertically extending members 30 and 31, respectively. The framework is supported from the base 4 by a pair of diagonally positioned support members 38 at the left-hand end of the framework and a pair of vertically extending members 42 at the right-hand end of the framework.

Attached to the left-hand end of the top plate 34 and extending transversely of the apparatus is a vertically extending plate 44. The plate 44 mounts a pair of members 46 within which there are rotatably mounted transversely extending shafts 48 and 50. The shaft 50 drives the shaft 48 by means of meshing gears 52, one of which is mounted on each of the shafts. The shaft 50 is driven by the upper end of an endless chain 54 passing over a sprocket 56 affixed to the shaft 50. The lower end of the chain 54 passes over a sprocket 58 mounted on a shaft 60 which extends transversely of the apparatus and is supported from the base plate 4 by means of support brackets 62. The shaft 60 is driven through a gear 64 affixed to the shaft 60 which is in mesh with the gear 66 attached to the shaft of a motor 70.

Figure 2:
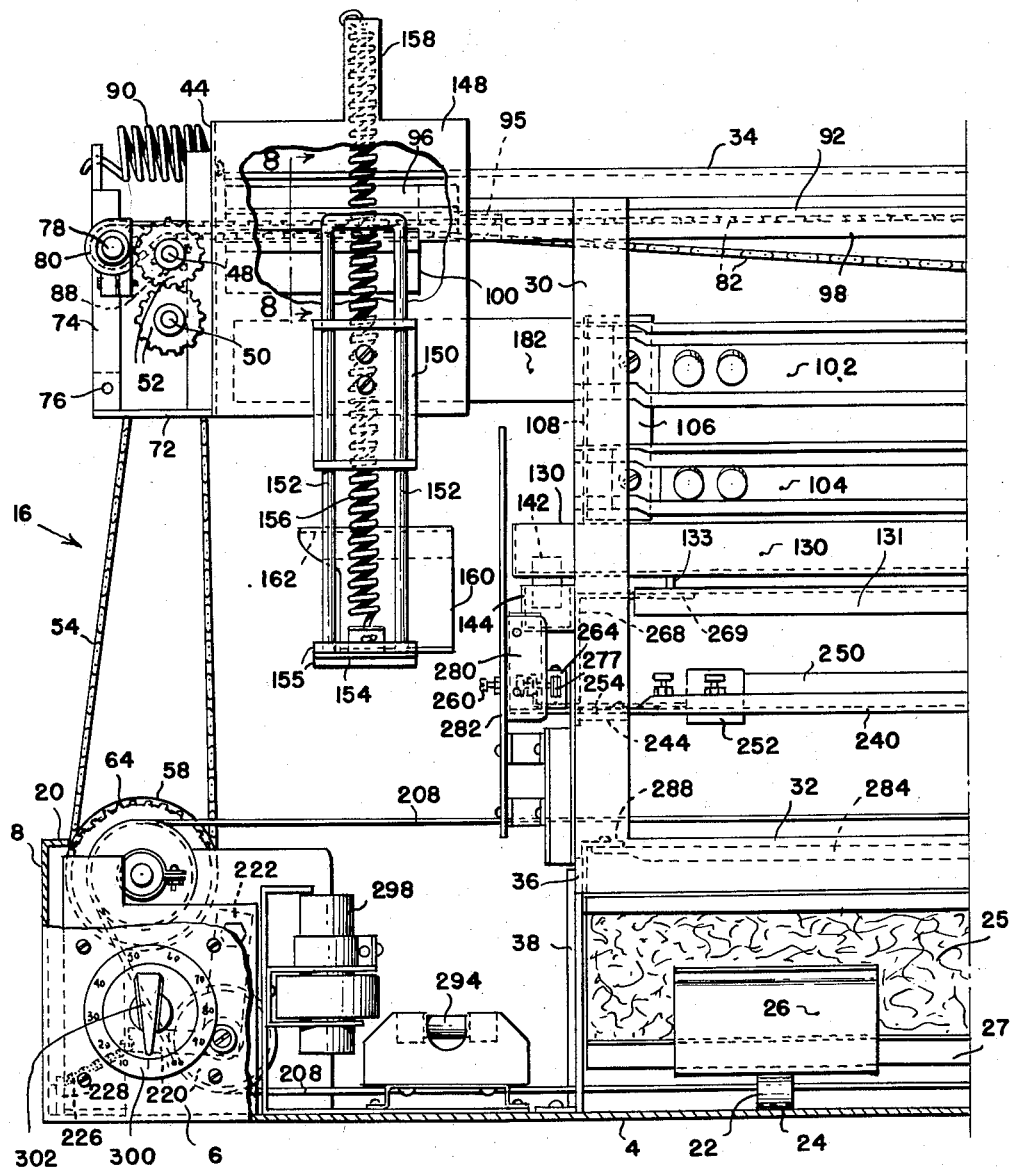
Figure 2 is a side elevation of the left-hand or loading end of the apparatus as viewed with the cover removed.

A horizontal plate 72 extending transversely of the apparatus is attached to the lower portion of the plate 44 and extends to the left thereof as viewed in Figure 2. An inverted stirrup frame 74 is pivotally mounted at 76 to the plate 72 and supports a rotatable shaft 78 extending transversely of the apparatus. A sprocket 80 affixed to the shaft 78 carries the left-hand end of an endless chain 82 as viewed in Figures 2 and 3. The right-hand end of the chain 82 passes over a sprocket 84 mounted on a hanger bracket 86 attached to the right-hand end of the top plate 34. The lower reach of the chain 82 passes over a sprocket 88 mounted on the shaft 48 whereby the chain is driven. A spring 90 is positioned between the upper portion of the stirrup 74 and the plate 44 and serves to urge the stirrup 74 to the left, as viewed in Figure 2, this maintaining tension on the chain 82.

The upper reach of the chain 82 is supported in a channel 92 which extends substantially the entire length of the apparatus. The left-hand end of the channel 92, as viewed in Figure 2, rests upon and is supported by a Z-shaped member 96, the upper flange of which is attached to the top plate 34 and the lower flange of which is provided with an upturned leg forming a channel 98 serving to carry the lower reach of the chain 82 at the left-hand end of the apparatus. A Z-shaped strip 95 is attached to the channel 92 and engages the rear side of the member 96 holding the channel 92 in position thereon while permitting relative longitudinal motion between the channel 92 and the member 96. A plate 100 extends downwardly diagonally from the front or right-hand edge of the channel 98 as viewed in Figure 8. The purpose of this plate will be hereinafter made clear. The right-hand end of the channel 92 is attached to and supported by the hanger plate 86.

Figure 3:
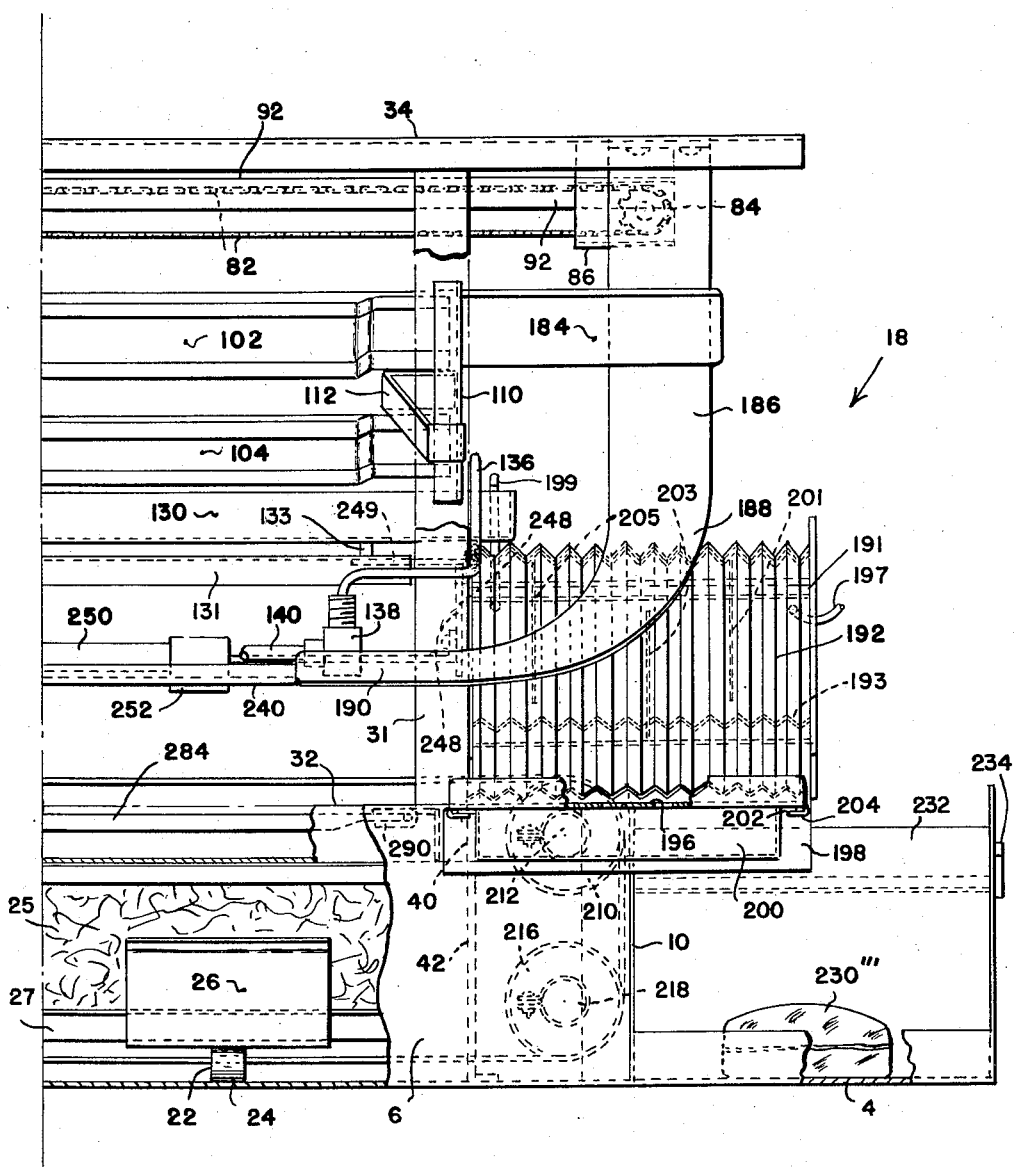
Figure 3 is a side elevation of the right-hand or discharge end of the apparatus as viewed with the cover removed.

Two heating elements 102 and 104 extend longitudinally of the apparatus. The left-hand ends of the elements are connected to an angle 106, as viewed in Figure 2, which is in turn supported by a bracket 108 attached to the front vertically extending frame member 30. The right-hand ends of the elements 102 and 104, as viewed in Figure 3, are supported by but permitted free longitudinal movement in a channel 110 which is supported by means of a bracket 112 affixed to the front frame member 31. The two elements 102 and 104 are supported one generally above the other in an inclined arrangement, the elements being in a common plane with the upper portion of the upper element 102 being inclined toward the front of the machine and a lower portion of the lower element 104 being inclined toward the rear of the machine.

A similar pair of elements 116 and 120 are positioned approximately adjacent to and to the rear of the elements 102 and 104. The left-hand ends of the elements 116 and 120 are affixed to a bracket 122 which is supported by means of a bracket 124 to the rear frame member 30. The right-hand ends of elements 116 and 120 are supported within a channel 126 and permitted free longitudinal movement therein. The channel 126 is supported by a bracket 128 from the rear frame member 31.

A tray 130 extends longitudinally of the apparatus below the heating elements 102, 104, 116 and 120. The tray is of sufficient width as to extend across the space provided between the elements. A tube 136 is adapted to supply water to the right-hand end of the tray 130 as viewed in Figure 3. A metering valve 138 is provided so that the flow through the tube 136 from a supply line 140 can be regulated and a controlled flow occurs from the right-hand end of the tray to the left-hand end thereof as viewed in Figures 2 and 3. At the left-hand end of the tray 130 there is provided a tube 142 which extends upwardly into the tray and serves to maintain a level of liquid within the tray as determined by the height of the upper end of the tube above the base of the tray 130. The tube is of such diameter that greases accumulating on top of the flow of water, as will be hereinafter described, are skimmed off and flow downwardly through the tube 142 into a discharge tray 144 extending transversely toward the rear of the apparatus. Liquids flowing through the discharge tray 144 are carried to drain through a suitable conduit 146.

The tray 130 rests upon cross bars 133 which in turn rest upon a longitudinally extending downwardly turned channel 131. The ends of the channel rest upon and are supported by longitudinally extending portions 269 and 249 of plates 268 and 248 extending between the frame members 30, 30 and 31, 31, respectively. By this arrangement longitudinal motion is permitted between the channel 131 and the frame members 30, 30 and 31, 31. The channel 131 extends substantially completely across the apparatus within the insulating cover and thus provides an effective separator plate separating an upper portion of the enclosure within the insulating cover from a lower portion thereof.

A plate 148 extending vertically and longitudinally of the apparatus is attached to the front end of the transverse plate 44. A channel 150 is mounted on the forward face of the plate and provided with bores in its forwardly extending legs serving to guide a pair of vertically extending rods 152 which slidably pass therethrough. A horizontal transversely extending plate 154 is attached to the lower ends of the rods 152. The left-hand end of the plate 154, as viewed in Figures 1 and 4, extends beyond the cover plate 14 and has its top and bottom surfaces covered with insulating plates 155.

A spring 156 having its lower end connected to the plate 154 and its upper end connected to an extension 158 of the upper portion of the plate 148 serves to urge the rods 152 and the plate 154 upwardly. The inward end of the horizontal plate 154 terminates at approximately the longitudinal center line of the apparatus and supports an angle 163 which is affixed to its upper surface and has an upwardly extending leg 160 inclined toward the front of the apparatus as viewed in Figure 4. A second shallow angle shaped member 162 is attached to the upper portion of the generally vertically extending flange of the angle 160 providing a longitudinally extending fork within which a hanger, such as the hanger shown generally at 164 in Figure 6, is adapted to be supported.

The hanger shown generally at 164 in Figure 6 includes a group of vertically extending wires 168 which are attached to an upper and lower horizontally extending wire 170 and a central horizontally extending wire 174. The lower ends 169 of the wires 168 and the side ends 175 of the wire 174 are turned forwardly or to the left, as viewed in Figure 6, and serve to support the sides and bottom of a piece of meat to be cooked. It will be evident that the forwardly turned ends 175 may be omitted and that the forwardly turned ends 169 may be modified in arrangement.

The upper ends of the outermost vertically extending wires 168 pass toward each other at the upper portion of the hanger at 172, pass upwardly adjacent at 174 and are formed into a forwardly extending hook at 176. The upwardly extending portions 174' and the hook 176 incline forwardly or to the left of the body portion of the hanger as viewed in Figures 6 and 4. The horizontally extending wires 170 are formed with their right-hand end portions 176, as viewed in Figure 6, passing backwardly and toward each other and then extending across behind the body portion of the hanger as shown at 178. The left-hand ends of the transversely extending portions 178 are joined together at 180 to form a vertically extending portion which is positioned slightly in front of the plane in which the portions 178 are positioned. While a wire lattice has been described, it will be evident that any suitable lattice structure may be employed for example, a lattice formed from a perforated sheet of metal, the essential considerations being that the lattice support the meat in suspended fashion from an overhead conveyor with the meat in an inclined position with its two major surfaces exposed for cooking.

Figure 4:
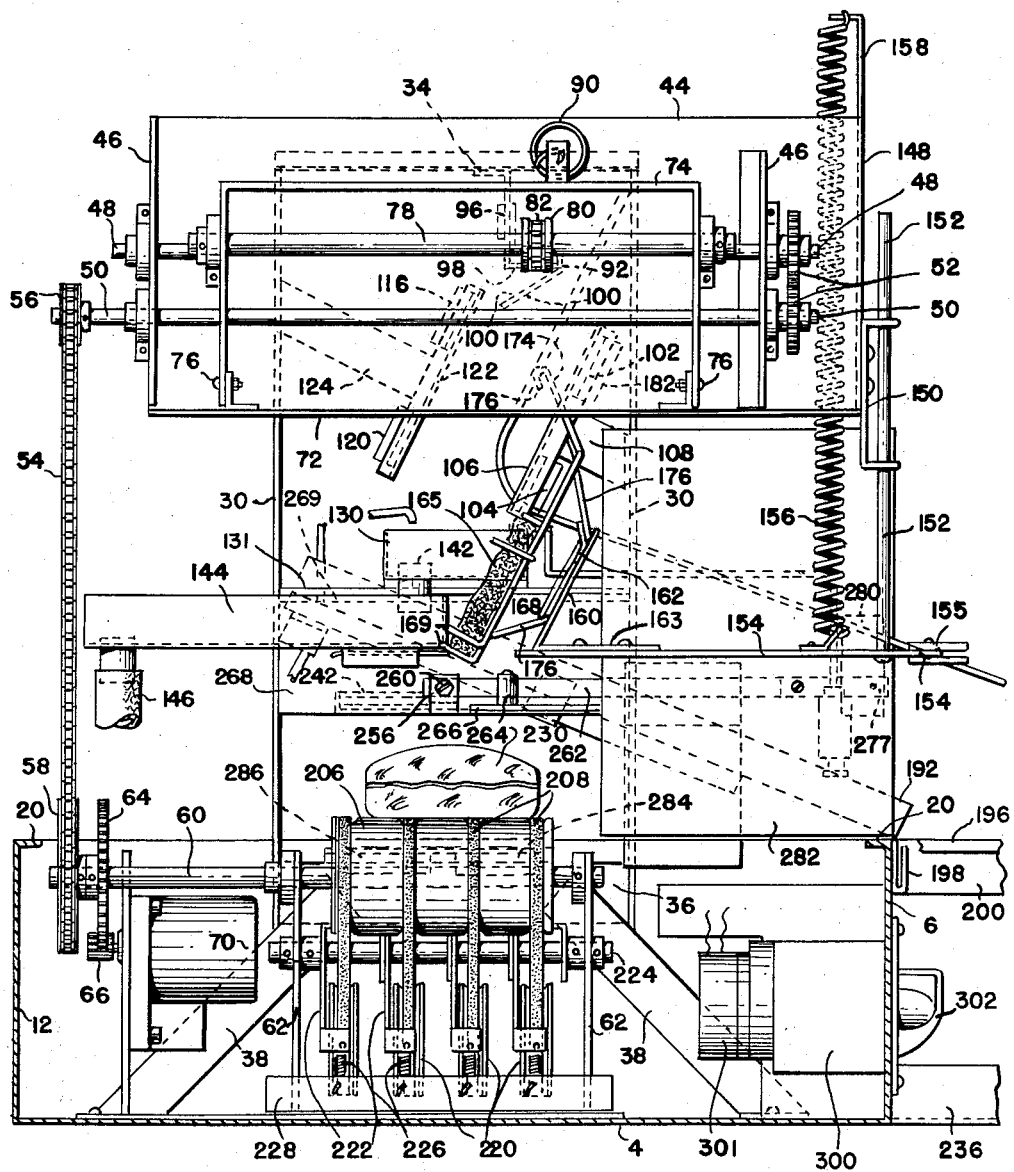
Figure 4 is an end elevation of the left-hand end of the apparatus as viewed with the cover removed.
Figure 5:
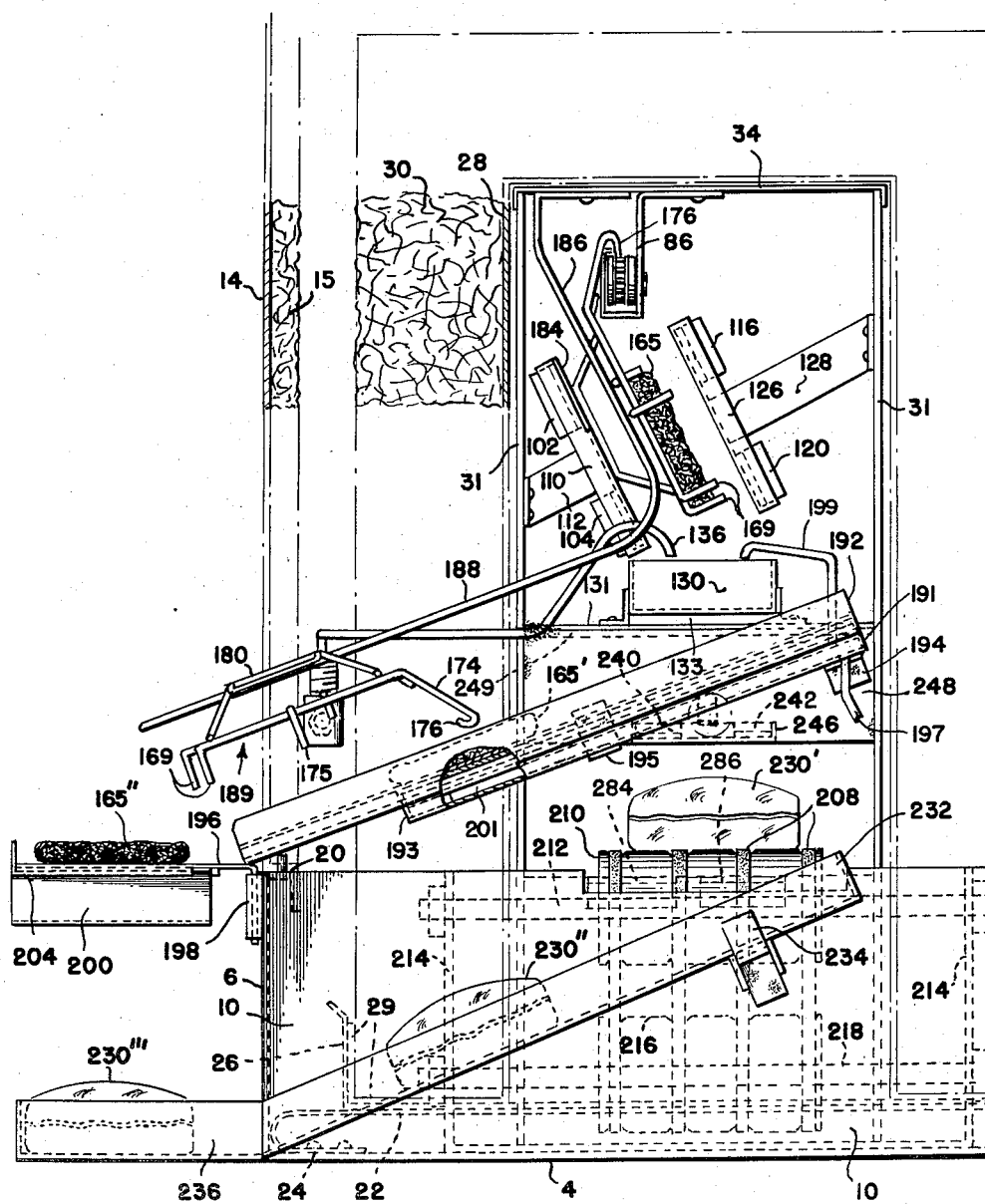
Figure 5 is an end elevation of the right-hand end of the apparatus as viewed with the cover removed.

When it is desired to pass a piece of meat to be cooked through the apparatus, the piece of meat, as shown at 165 in Figure 4, is placed on the carrier and the operator will grasp the outer heat insulated end 155 of the plate 154 and depress the plate sufficiently to permit the carrier to be positioned on the angles 160 and 162 with the upper wire 178 resting within the fork behind the small angle 162 and the lower wire 178 resting upon the lower portion of the upper leg 160 of the angle. With the hanger in this position, the operator will raise the plate. As the plate is raised, the hook 176 of the hanger will engage the inclined plate 100 attached to the lower portion of the channel 98 and be rocked to the right, as viewed in Figure 4, with the whole hanger pivoting on the upper wire 178 which is supported behind the angle 162. As the hanger is lifted, the hook 176 passes to the right of the channel 98 and the channel 92, as viewed in Figures 4 and 8, and finally moves to the left across the top of the flange 94 shown in Figure 8. When the hanger has been thus lifted to its uppermost position, the operator will release the plate 154 and the plate will drop downwardly to the position shown in Figure 2 whereupon the hook 176 of the hanger will come to rest upon the upper reach of the chain 82, the hanger will swing as a pendulum from the hook 176 and the upper wire 178 will come to rest in engagement with a plate 182 extending to the left of the apparatus from the left-hand end of the heating element 102 as viewed in Figure 2.

If the motor 70 is in operation, the movement of the chain will thereupon carry the hanger and the piece of meat to the right, as viewed in Figure 2, between the heating elements 102, 104, 116 and 120 with the meat carried by the hanger being positioned centrally between the heating elements by the upper wire 178 bearing upon the heating element 102.

After the hanger has been carried for the longitudinal length of the apparatus by means of the chain 82 with the meat positioned between the heating elements and the upper wire 178 of the hanger sliding along the upper heating element, the hanger will be carried beyond the right-hand ends of the heating elements whereupon the upper wire 178 will be supported by a horizontally extending blade 184 extending to the right from the right-hand end of the heating element 102 as viewed in Figure 3.

A generally vertically extending strap 186 having its upper end connected to the top plate 34 extends downwardly and slightly to the rear of the apparatus behind the right-hand end of the blade 184 as viewed in Figure 5. At approximately the level of the lower portion of the heating element 104, the strap 186 curves toward the front of the apparatus as indicated at 188 in Figure 5. The strap portion 188 extends to the front of the apparatus whereupon it curves toward the left of the apparatus, as indicated at 190 in Figures 1 and 3. The generally vertically extending portion 186 of the strap is positioned behind the blade 184 so as to pass behind the wires 178 and the body of the hanger as the hanger is delivered from the right-hand end of the chain 82 as viewed in Figure 3. When the hanger is thus delivered, it will drop from the chain and sprocket 84 and, upon reaching the horizontally extending portion 188 of the strap, the hanger will be supported by the wires 178 resting thereon. At this time the cooked serving of meat will drop from the hanger and the empty hanger will be carried down the strap 188, as indicated at 189 in Figure 5, and be delivered from the apparatus by the portion of the strap 190.

A corrugated tray 192 extends transversely of the right-hand end of the apparatus, as viewed in Figures 4 and 5, and inclines downwardly toward the front of the apparatus with the corrugations extending in a generally upward and downward direction. The corrugated tray 192 rests upon a similarly corrugated upper surface of a flat tank, the generally uppermost end of which terminates adjacent to the generally uppermost end of the tray 192 as indicated at 191 and the generally lowermost end of the tank terminates at a location spaced from the lower end of the tray 191 as indicated at 193. An inlet conduit 197 is connected to the upper right-hand portion of the tank as viewed in Figure 3 and an outlet conduit 199 is connected to the upper left-hand portion of the tank as viewed in Figure 3. The inlet conduit 197 is adapted to be connected to any suitable source of cooling water and the outlet conduit 199 extends over and terminates above the tray 130 in such a position as to discharge into the tray 130 cooling water which has passed through the tank. Three baffles 201, 203 and 205 are positioned within the tank in order to deflect the flow of cooling water therethrough from the inlet conduit 197 to the outlet conduit 199. The baffle 201 extends downwardly from the upper end of the tank and terminates in spaced relation with the lower end of the tank. The baffle 203 extends upwardly from the lower end of the tank and terminates in spaced relation with the upper end of the tank and the baffle 205 extends downwardly from the upper end of the tank and terminates in spaced relation with the lower end of the tank. The tank is supported by brackets 194 and 195 affixed to the framework of the apparatus.

It will be evident that the corrugated tray 192 will be cooled by its contact with the similarly corrugated upper surface of the tank which serves to support the tray. This cooling is desirably provided for the reason that the corrugated tray has its upper end terminating within the heated chamber provided by the apparatus and the upper end of the tray without cooling means thereby becomes heated to such a temperature that the film of grease formed on the tray by drippings from meat discharged thereby is varorized producing the desirable smoke and undesirable deposits on the tray.

The front or lower end of the corrugated tray 192 extends over a horizontally extending shelf 196 which extends outwardly from the front of the apparatus and is removably attached thereto by means of a clip bracket 198 affixed to the front plate 6. The shelf 196 is perforated and a tray 200 having outwardly extending flanges 202 is supported beneath the shelf 196 by passage of the flanges 202 within downwardly and inwardly turned channel portions 204 of the shelf 196. It will be evident that a piece of meat 165', as shown in Figure 5, having dropped from a discharging hanger 189 will fall upon the inclined tray 192. The meat will slide down the tray and upon the shelf 196 as indicated at 165". The corrugated tray 192 and the perforated shelf 196 insure the isolation of the cooked meat from grease drippings which pass downwardly through the corrugations and through the perforations in the shelf 196 into the tray 200.

A drum 206 is fixed to and driven by the shaft 60 and is provided with a plurality of circumferentially extending grooves for the reception of endless straps 208 forming a conveyor belt extending between the drum 206 positioned at the left-hand end of the apparatus and a drum 210 mounted at the right-hand end of the apparatus on a shaft 212 supported between upstanding legs of a bracket frame 214 as shown in Figure 5. The conveyor straps 208 pass below a second drum 216 at the right-hand end of the apparatus which is rotatably mounted on a shaft 218 also mounted in the bracket 214. At the left-hand end of the apparatus as viewed in Figure 4, the lower reach of the conveyor straps 208 pass around individual rollers 220 each of which is suspended by a bracket 222 from a shaft 224 mounted in the frame members 62. Springs 226 connected between the brackets 222 and a plate 228 affixed to the frame members 62 serve to individually urge each of the rollers 220 toward the left-hand end of the apparatus, thus maintaining tension on each of the conveyor straps 208.

The conveyor straps 208 are adapted to receive rolls, as indicated at 230 in Figure 4 and 230' in Figure 5. It will be evident by viewing Figure 1 that the cut-away portion 16 of the cover 14 permits access to the left-hand end of the conveyor straps 208 for the placement of the rolls thereon. The conveyor straps 208 carry the rolls to the right-hand end of the apparatus as indicated at 230' in Figure 5.

The rolls discharged from the conveyor straps are received by an inclined chute 232, the upper and rear end of which is supported from the right-hand end plate 10 by means of a bracket 234 and the lower or front end of which is formed with a horizontally extending portion 236 which is adapted to rest upon the surface supporting the entire apparatus.

Rolls delivered from the conveyor straps 208 will slide down the inclined chute 232, as indicated at 230", and come to rest upon the horizontally extending portion 236 of the chute as indicated at 230'''. The roll, in passing through the apparatus will have been toasted by heating elements which will now be described.

A pair of horizontally adjacently positioned heating elements 240 and 242 extend longitudinally of the apparatus above the conveyor straps 208 and spaced therefrom by a sufficient distance to permit the passage of rolls 230. The left-hand ends of the heating elements 240 and 242, as viewed in Figure 2, are affixed to a cross member 244 which is in turn attached to the plate 268. The right-hand ends of the heating elements 240 and 242 are supported by a channel-shaped member 246 shown in Figure 5. The channel-shaped member 246 is attached to a plate 248 extending transversely between the two vertical frame members 31. The left-hand ends of the heating elements 240 and 242 are rigidly connected to the support member 244 and the right-hand ends of the elements are free to move longitudinally within the channel 246 in response to changes of length resulting from temperature changes.

A quartz rod 250 is positioned between the elements 240 and 242 and extends for a substantial portion of the length of the elements. The right-hand end of the quartz rod, as viewed in Figure 3, is rigidly connected to at least one of the heating elements by means of an attaching bar 252. Thus, as the elements expand and contract in response to their heating and cooling, the right-hand end of the quartz rod moves therewith. A bar 254 is connected to the left-hand end of the quartz rod 250, as viewed in Figures 2 and 7, and extends beyond the support member 244 and rests thereon. The extreme left-hand end of the bar 254 is turned upwardly at 256 and is threaded to receive a set screw 260.

A bar 262 extending transversely of the apparatus is pivoted on a pivot mounting 264 which is supported by a horizontally extending plate 266 extending outwardly to the left from a vertical plate 268 supported between frame members 30 as shown in Figures 2 and 4. The innermost end 270 of the bar 262 is adapted to be engaged by the set screw 260. The outermost end 277 of the bar 262 is adapted to engage the actuating button of a control switch 280. The control switch 280 is mounted on a plate 282 supported from the frame members 30. It will be evident that the quartz rod, which undergoes substantially no expansion or contraction with temperature changes, will cause movement of the set screw 260 in response to changes of length of the heating elements 240 and 242. As the elements expand, the set screw 260 will be drawn against the inner end 270 of the bar 262 causing the outer end 277 of the bar 262 to move to the left, as viewed in Figures 2 and 7, and to actuate the switch 280 which serves to control the flow of electric power to the heating elements as will be hereinafter described.

Below the conveyor strap 208 there is positioned a second pair of horizontally adjacent, longitudinally extending heating elements 284 and 286. These elements are positioned sufficiently below the conveyor straps 208 so that the straps, when depressed by the weight of a plurality of rolls 230, will not rest thereon and yet the elements are sufficiently close to provide the necessary toasting for the bottom of the roll exposed thereto between the straps. The left-hand ends of the elements 206 and 208 are rigidly connected to a cross member 288 supported by the vertically extending frame members 30, as viewed in Figure 2. The right-hand ends of the heating elements 284 and 286 are supported by channel member 290, as viewed in Figure 3, which permits longitudinal motion of the elements. The channel member 290 is supported by the vertically extending frame members 31.

Figure 9:
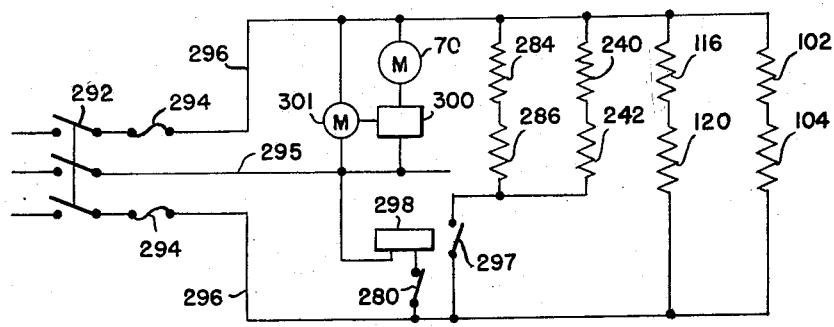
Figure 9 is a diagram of the electrical circuit involved in the apparatus.

The electrical system, as shown diagrammatically in Figure 9, is preferably connected through any suitable type of disconnect switch 292 to a conventional three wire source of electric power at 220 v. A pair of conductors 296 are connected through fuses 294 and the disconnect switch 292 to the 220 v. lines. Each of the pairs of heating elements previously described is connected in series and each series pair is connected across the 220 v. lines. The control switch 280 is connected in series with a coil of a solenoid relay 298 across one of the lines 294 and the neutral line 295. The armature 297 of the solenoid relay is connected between one of the lines 294 and the two pairs of lower heating elements 284 and 286, and 240 and 242 to control the flow of power therethrough. Thus, only the lower two pairs of heating elements 242, 240, 280 and 286 are affected by the quartz rod control and the control switch 280. The arrangement is such that with the apparatus cold the control switch 280 is closed and when the disconnect switch 292 is closed, the relay 298 is energized, closing the contact 297 and energizing the heating elements 284, 286, 240 and 242. When the temperature of the controlled elements reaches a predetermined value, the control switch 280 opens and the controlled elements are deenergized. The elements 116, 120 and 102, 104 are energized whenever the switch 292 is closed.

The drive motor 70, previously described, is provided with a speed control in the form of an interrupter type controller 300 driven by a motor 301 which is adjusted by means of a control which is provided with an adjustably positionable knob or pointer 302 by means of which the control may be set by an operator. This type of motor speed control system is entirely conventional and need not be described in detail.

From the foregoing it will be evident that in operation of the apparatus an operator will take a piece of meat to be cooked and place it on a hanger such as shown in Figure 6, and then position the hanger on the supporting angles 160 and 162 which are readily accessible through the opening indicated at 16 in Figure 1 provided in the cover 14 when the handle portion 155 of the support plate 154 is depressed against the urging of the spring 156. After the hanger has been positioned on the angles 160 and 162, the operator will raise the support means and the hanger will ride over the plate 100 and the channels 98 and 92 and move into position above the upper reach of the conveyor 82, and thereafter downward movement of the support angles will free the hanger for transportation by the conveyor 82 through the cooking apparatus.

An inverted channel 207 shown in Figure 1 is desirably positioned within the opening indicated at 16 over the conveyor straps 208 and below the plate 154. This channel prevents the plate 154 from being moved downwardly an excessive distance and insures the proper positioning of the rolls on the conveyor straps 208.

At the same time that a piece of meat is entered into the cooking apparatus, a roll will be placed on the conveyor straps 208. The conveyor straps 208 and the conveyor chain 82 are preferably driven at approximately equal linear velocities and thus the cooked meat and the toasted roll are delivered from the discharge end of the apparatus simultaneously. As previously described, the hanger is discharged from the apparatus on the discharge strap 190, the cooked portion of meat is discharged onto the perforated shelf 196, and the toasted roll is discharged into receiver tray 236.

Due to the fact that the meat is carried through the upper portion of the apparatus within the insulated housing and rolls are carried through the lower portion of the apparatus, and the meat cooking space is separated from the roll toasting space by the drip catcher tray 130 and the separator plate 131, the meat is subjected to higher temperature than are the rolls. Furthermore, by providing controlled elements only below the separator plate, this temperature differential is increased. This temperature differential is essential if the meat is to be cooked in the same time interval during which the roll is merely toasted. By way of example, it may be stated that the temperature to which the meat is exposed is approximately 1200° F. whereas the temperature to which the roll is exposed is approximately 400° F.

It will be evident that only the temperature of the cooking apparatus in the vicinity traversed by the roll is regulated by adjusting the set screw 260 which serves to control the actuation of the control switch 280 at a higher or lower temperature depending upon the setting of the set screw. This control is adjusted to provide a roll which is satisfactorily toasted in the time interval during which a piece of meat passing through the apparatus becomes properly cooked. This time interval may be, for example, one minute. Once this control has been adjusted, the apparatus is covered by the insulated enclosure and then a secondary adjustment can be made by adjusting the speed of travel of the meat and roll through the apparatus. This secondary adjustment provides a very accurate control of the degree to which meat passing through the apparatus is cooked. It should be noted that the toasting of the roll is not as critical with respect to time as cooking of the meat and thus modifications made in the time of passage of the roll through the apparatus in conjunction with the control of the meat being cooked are not of such a nature as to substantially affect the degree of toasting accomplished. These speed modifications do, however, substantially affect the degree to which the meat is cooked and, as previously noted, serve as a sensitive and accurately controlled means for varying the degree to which the meat is cooked.

From the foregoing it will be evident that the invention provides an apparatus within which a roll conveying means, a meat conveying means, heating elements, a partition and a drip catching tray are all mounted in such a manner that there is provided freedom of movement between them and the frame of the apparatus and thus, when there occurs successive heating and cooling such as will take place each time the machine is shut off and then reheated, there is no loading, buckling or other adverse reaction to the temperature changes.

It will also be evident that the invention provides a neat, clean, efficient apparatus for cooking foods and, more particularly, for preparing hamburger sandwiches. The position of the meat in the upper portion of the enclosure or oven adjacent to the heating elements provides a well cooked piece of meat which passes through a region of maximum temperature within the oven.

The provision of the particular type of hanger disclosed and the pitch or incline of the heating elements which, in combination, permits the hanger to rest upon one of the heating elements or a suitable guide means provided adjacent to the heating elements insures proper positioning of the meat between the heating elements while providing a free space for drippage to occur while the meat is being cooked. This arrangement insures evenly and consistently cooked servings of meat.

The provision of a drip catching tray and of a separator plate not only prevents the rolls from being spotted or otherwise adversely affected by drippings from the meat, but also provides a temperature differential within the enclosure such that the apparatus will provide a properly toasted roll in the same length of time that is required to properly cook a portion of meat. This effect is additionally insured by the provision of the temperature controlling element in association with the roll toasting heating elements which are mounted in the lower portion of the oven.

It will be evident that various modifications may be made in the embodiment of the invention disclosed herein without departing from the scope of the invention as set forth in the following claims.

What is claimed is:

1. Apparatus for cooking foods comprising means providing an elongated enclosure, inclined means comprising heating means extending longitudinally of said enclosure, a conveyor extending longitudinally through said enclosure above said heating means, and a hanger adapted to be suspended from said conveyor and to carry a piece of meat through said enclosure adjacent to said heating means, said hanger being formed of a lattice and having means extending outwardly from one face of the lattice for supporting a piece of meat, means forming a hook extending upwardly from the lattice and inclined toward the side of the lattice from which said meat supporting means extends to support said lattice in an inclined position adjacent to said heating means and means extending rearwardly from the lattice and bearing against said inclined means guiding said hanger as it is carried through said enclosure by said conveyor.

2. Apparatus for cooking foods comprising means providing an elongated enclosure, inclined means comprising heating means extending lonigtudinally of said enclosure, an endless conveyor having an upper and a lower reach extending longitudinally through said enclosure above said heating means, a hanger adapted to be suspended from said conveyor and to carry a piece of meat through said enclosure adjacent to said heating means, said hanger being formed of a lattice and having means extending outwardly from one face of the lattice for supporting a piece of meat, means for engaging said conveyor extending upwardly from the lattice and inclined toward the side of the lattice from which said meat supporting means extends to support said lattice in an inclined position adjacent to said heating means and means extending rearwardly from the lattice and forming a hook, the outside of the hook being positioned to bear against said inclined means to guide said hanger as it is carried through said enclosure by said conveyor, said conveying means dropping from said conveyor at the discharge end thereof, and means adapted to receive said hanger upon dropping thereof from the discharge end of said conveyor and to support said hanger by said hook with said meat carrying face in such a position that the cooked piece of meat falls from the hanger as it is discharged.

3. Apparatus for cooking foods comprising a horizontally extending heated enclosure having vertically inclined guide means extending longitudinally therethrough, a conveyor extending longitudinally through said enclosure above said guide means, and a hanger adapted to be suspended from said conveyor and to carry a piece of meat through said enclosure adjacent to said guide means, said hanger being formed of a lattice and having means extending outwardly from one face of the lattice for supporting a piece of meat, means for engaging said conveyor extending upwardly from the lattice and inclined toward the side of the lattice from which said meat supporting means extends to support said lattice in an inclined position adjacent to said guide means and a portion of said hanger being adapted to bear against said inclined guide means to guide said hanger as it is carried through said enclosure by said conveyor.

4. Apparatus for cooking foods comprising a horizontally extending heated enclosure having vertically inclined guide means extending longitudinally therethrough, an endless conveyor having an upper and a lower reach extending longitudinally through said enclosure above said guide means, a hanger adapted to be suspended from said conveyor and to carry a piece of meat through said enclosure adjacent to said guide means, said hanger being formed of a lattice and having means extending outwardly from one face of the lattice for supporting a piece of meat, means for engaging said conveyor extending upwardly from the lattice and inclined toward the side of the lattice from which said meat supporting means extends to support said lattice in an inclined position adjacent to said guide means and a portion of said hanger being adapted to bear against said inclined guide means to guide said hanger as it is carried through said enclosure by said conveyor, said engaging means dropping from said conveyor at the discharge end thereof, and means adapted to receive said hanger upon dropping thereof from the discharge end of said conveyor and to support said hanger with said meat carrying face in such a position that the cooked piece of meat falls from the hanger as it is discharged.

5. Apparatus for cooking foods comprising a horizontally extending heated enclosure having guide means extending longitudinally therethrough, a conveyor extending longitudinally through said enclosure above said guide means, and a hanger adapted to be suspended from said conveyor and to carry a piece of meat through said enclosure adjacent to said guide means, said hanger being formed of a lattice and having means extending outwardly from one face of the lattice for supporting a piece of meat, means for engaging said conveyor extending upwardly from the lattice and inclined toward the side of the lattice from which said meat supporting means extends to support said lattice in an inclined position adjacent to said guide means and a portion of said hanger being adapted to bear against said guide means to guide said hanger as it is carried through said enclosure by said conveyor, and a tray adapted to contain water mounted below said conveyor to catch drippings from the meat during the cooking thereof.

6. Apparatus for cooking foods comprising a horizontally extending heated enclousre having guide means extending longitudinally therethrough, an endless conveyor extending longitudinally through said enclosure above said guide means, a hanger adapted to be suspended from said conveyor and to carry a piece of meat through said enclosure adjacent to said guide means, said hanger being formed of a lattice and having means extending outwardly from one face of the lattice for supporting a piece of meat, means for engaging said conveyor extending upwardly from the lattice and inclined toward the side of the lattice from which said meat supporting means extends to support said lattice in an inclined position adjacent to said guide means and a portion of said hanger being adapted to bear against said guide means to guide said hanger as it is carried through said enclosure by said conveyor, and a tray adapted to contain water mounted below said conveyor to catch drippings from the meat during the cooking thereof, said engaging means dropping from said conveyor at the discharge end thereof, and means adapted to receive said hanger upon dropping thereof from the discharge end of said conveyor and to support said hanger with said meat carrying face in such a position that the cooked piece of meat falls from the hanger as it is discharged.

7. Apparatus for cooking foods comprising a horizontally extending heated enclosure having guide means extending longitudinally therethrough, an endless conveyor extending longitudinally through said enclosure above said guide means, a hanger adapted to be suspended from said conveyor and to carry a piece of meat through said enclosure adjacent to said guide means, said hanger being formed of a lattice and having means extending outwardly from one face of the lattice for supporting a piece of meat, means for engaging said conveyor extending upwardly from the lattice and inclined toward the side of the lattice from which said meat supporting means extends to support said lattice in an inclined position adjacent to said guide means and a portion of said hanger being adapted to bear against said guide means to guide said hanger as it is carried through said enclosure by said conveyor, said engaging means dropping from said conveyor at the discharge end thereof, and means adapted to receive said hanger upon dropping thereof from the discharge end of said conveyor, to support said hanger with said meat carrying face in such a position that the cooked piece of meat falls from the hanger and then to discharge the hanger from the receiving means.

8. Apparatus for cooking foods comprising a horizontally extending heated enclosure having guide means extending longitudinally therethrough, an endless conveyor extending longitudinally through said enclosure above said guide means, a hanger adapted to be suspended from said conveyor and to carry a piece of meat through said enclosure adjacent to said guide means, said hanger being formed of a lattice and having means extending outwardly from one face of the lattice for supporting a piece of meat, means for engaging said conveyor extending upwardly from the lattice and inclined toward the side of the lattice from which said meat supporting means extends to support said lattice in an inclined position adjacent to said guide means and a portion of said hanger being adapted to bear against said guide means to guide said hanger as it is carried through said enclosure by said conveyor, said engaging means dropping from said conveyor at the discharge end thereof, an arm on said hanger spaced from said lattice, a strap adapted to be engaged between said arm and said lattice on the dropping of said engaging means from the conveyor, said strap being developed to guide said hanger to such a position that the cooked piece of meat falls from the hanger and being inclined to provide for the discharge of the hanger from the strap by gravity.

References Cited in the file of this patent

UNITED STATES PATENTS

| | | |
|---|---|---|
| 533,795 | Edwards | Feb. 5, 1895 |
| 1,071,925 | Keith | Sept. 2, 1913 |
| 1,215,547 | Juengst | Feb. 13, 1917 |
| 1,934,904 | Barnett et al. | Nov. 14, 1933 |
| 2,028,944 | Morrison | Jan. 28, 1936 |
| 2,097,471 | Scharsch | Nov. 2, 1937 |
| 2,138,813 | Bemis | Dec. 6, 1938 |
| 2,142,390 | Zerr | Jan. 3, 1939 |
| 2,151,401 | Belcher | Mar. 21, 1939 |
| 2,160,351 | Bemis | May 30, 1939 |
| 2,238,309 | Cramer | Apr. 15, 1941 |
| 2,295,651 | Gustavson | Sept. 15, 1942 |
| 2,337,117 | Lloyd | Dec. 21, 1943 |
| 2,517,253 | Spaeth | Aug. 1, 1950 |
| 2,548,524 | Eckhoff | Apr. 10, 1951 |
| 2,565,174 | Fredenhagen et al. | Aug. 21, 1951 |
| 2,689,517 | Angelus | Sept. 21, 1954 |
| 2,718,188 | Read et al. | Sept. 30, 1955 |
| 2,728,286 | Ehrenberg | Dec. 27, 1955 |